United States Patent
Niimura et al.

(10) Patent No.: US 10,479,199 B2
(45) Date of Patent: Nov. 19, 2019

(54) DISCONNECTABLE POWER TRANSFER UNIT

(71) Applicant: GKN Driveline Japan Ltd, Tochigi, Tochigi (JP)

(72) Inventors: Satoshi Niimura, Tochigi (JP); Masashi Aikawa, Tochigi (JP)

(73) Assignee: GKN Driveline Japan Ltd, Tochigi (JP)

( * ) Notice: Subject to any disclaimer, the term of this patent is extended or adjusted under 35 U.S.C. 154(b) by 0 days.

(21) Appl. No.: 15/921,729

(22) Filed: Mar. 15, 2018

(65) Prior Publication Data

US 2018/0201128 A1    Jul. 19, 2018

Related U.S. Application Data

(63) Continuation of application No. PCT/JP2015/081610, filed on Nov. 10, 2015.

(51) Int. Cl.
  B60K 23/08    (2006.01)
  B60K 17/344    (2006.01)
  (Continued)

(52) U.S. Cl.
  CPC .......... B60K 23/08 (2013.01); B60K 17/344 (2013.01); F16D 11/14 (2013.01); F16D 28/00 (2013.01);
  (Continued)

(58) Field of Classification Search
  CPC ...... B60K 17/02; B60K 17/344; B60K 23/08; B60K 23/0808; B60K 2023/0833;
  (Continued)

(56) References Cited

U.S. PATENT DOCUMENTS

| | | | | |
|---|---|---|---|---|
| 5,884,738 A | * | 3/1999 | Joslin | B60K 17/02 192/35 |
| 6,206,159 B1 | * | 3/2001 | Takuno | B60K 17/02 192/110 B |

(Continued)

FOREIGN PATENT DOCUMENTS

| | | |
|---|---|---|
| CN | 103889765 A | 6/2014 |
| EP | 2769865 A1 | 8/2014 |

(Continued)

OTHER PUBLICATIONS

International Search Report and Written Opinion for PCT/JP2015/081610 dated Feb. 2, 2016 (9 pages; with English translation).

(Continued)

*Primary Examiner* — Ha Dinh Ho
*Assistant Examiner* — Bobby Rushing, Jr.
(74) *Attorney, Agent, or Firm* — Bejin Bieneman PLC

(57) ABSTRACT

A power transfer unit is comprised of: a hollow input shaft rotatable about the first axis; an intermediate shaft rotatable about the first axis; an output shaft in mesh with the intermediate shaft and rotatable about the second axis; a clutch coupling the input shaft with the intermediate shaft; an input member rotatable about the first axis and including an eccentric shaft eccentric from the first axis; a fixed member immovable about the first axis; an intermediate member fitting on the eccentric shaft to make an eccentric motion and meshing with the fixed member to make a rotary motion about the eccentric shaft; an output member engaging with and following the intermediate member; and a cam mechanism interposed between the output member and the clutch and converting the rotary motion of the output member into an axial motion.

7 Claims, 6 Drawing Sheets

(51) Int. Cl.
- *F16D 11/14* (2006.01)
- *F16D 28/00* (2006.01)
- F16D 23/12 (2006.01)
- F16H 1/32 (2006.01)

(52) U.S. Cl.
CPC .. *F16D 2023/123* (2013.01); *F16H 2001/325* (2013.01)

(58) Field of Classification Search
CPC .... F16D 11/14; F16D 28/00; F16D 2023/123; F16H 2001/323; F16H 2001/327; F16H 2057/02052
See application file for complete search history.

(56) References Cited

U.S. PATENT DOCUMENTS

| | | | | |
|---|---|---|---|---|
| 6,698,565 B2 * | 3/2004 | Cool | .............. | F16H 48/08 180/248 |
| 7,481,307 B2 * | 1/2009 | Teraoka | .............. | F16D 28/00 192/84.6 |
| 7,895,913 B2 * | 3/2011 | Mizon | .............. | B60K 17/3467 192/84.6 |
| 7,896,146 B2 * | 3/2011 | Pritchard | .............. | F16D 28/00 192/70.23 |
| 7,905,312 B2 * | 3/2011 | Kato | .............. | B60K 23/0808 180/245 |
| 8,740,745 B2 * | 6/2014 | Murayama | .............. | F16H 61/12 477/8 |
| 2004/0116230 A1 | 6/2004 | Hakui | | |
| 2005/0202918 A1 * | 9/2005 | Mizon | .............. | B60K 17/35 475/198 |
| 2007/0137966 A1 * | 6/2007 | Francis | .............. | B60K 17/02 192/20 |
| 2010/0100294 A1 * | 4/2010 | Hirao | .............. | F16D 28/00 701/68 |
| 2014/0251083 A1 | 9/2014 | Suzuki et al. | | |
| 2016/0236567 A1 | 8/2016 | Uchida et al. | | |
| 2016/0238107 A1 | 8/2016 | Hirota et al. | | |
| 2018/0099563 A1 * | 4/2018 | Nozu | .............. | F16D 25/061 |

FOREIGN PATENT DOCUMENTS

| | | |
|---|---|---|
| JP | 2004-125145 A | 4/2004 |
| JP | 2011-057136 A | 3/2011 |
| JP | 2013-100079 A | 5/2013 |
| WO | 2013058357 A1 | 4/2013 |
| WO | 2015068821 A1 | 5/2015 |
| WO | 2015071938 A1 | 5/2015 |

OTHER PUBLICATIONS

Office Action dated Oct. 23, 2018 for Japanese Patent Application No. 2017-549901 (8 pages; with English translation).

* cited by examiner

DISCONNECTABLE POWER TRANSFER UNIT

CROSS-REFERENCE TO RELATED APPLICATIONS

This application is a continuation application of PCT International Application No. PCT/JP2015/081610 (filed Nov. 10, 2015), the entire contents of which are incorporated herein by reference.

BACKGROUND

In a front-wheel drive vehicle, for example, an engine loaded on a front part of the vehicle body generates torque and a differential receives and distributes the torque to right and left front wheels. In a case of a four-wheel drive vehicle, a power transfer unit (PTU) may be used in combination with a transmission including a differential, which extracts and transfer the torque in part to rear wheels.

Also in a four-wheel drive vehicle loaded with a PTU, a structure that is capable of temporarily shifting into a two-wheel drive mode may be used. In this case, one or more clutches for temporarily cutting off power transmission are inserted into any part in the powertrain system from the PTU to the rear differential. When the clutch is disconnected, the engine is freed from load for rotation of a part of the powertrain downstream relative to the clutch. This configuration works in favor of improvement in fuel economy. A clutch requires an actuator creating sufficiently great driving force for operation thereof because a thrust force to disconnect it acts on the clutch. This may, of course, cause result in an increase of PTU size. In addition, as its operation requires considerable electricity, this may cause reduction in energy efficiency. As disclosed in WO 2015/071938 A1, clutch teeth have a meshing structure at the back thereof, having a larger angle than the clutch teeth provided to secondarily create thrust force, thereby assisting the clutch to keep in mesh. This art thus enables use of a relatively compact actuator. This meshing structure, however, requires considerable play, which might undermine reliability of the clutch.

SUMMARY

The present disclosure relates to a power transfer unit for distributing torque from one axle to another axle in a vehicle, particularly in a four-wheel drive vehicle, and in particular to a power transfer unit capable of enabling and disabling torque distribution with high reliability while being compact.

According to an aspect, a power transfer unit intermissively transferring torque about a first axis toward a second axis different from the first axis is comprised of: a hollow input shaft rotatable about the first axis and so dimensioned as to allow penetration of an axle along the first axis; an intermediate shaft rotatable independently from the input shaft about the first axis; an output shaft in mesh with the intermediate shaft and rotatable about the second axis; a clutch intermissively and drivingly coupling the input shaft with the intermediate shaft; a motor including a rotor rotating about the first shaft; an input member coupled with the rotor to be rotatable about the first axis and including an eccentric shaft eccentric from the first axis; a fixed member immovable about the first axis; an intermediate member fitting on the eccentric shaft to make an eccentric motion and meshing with the fixed member to make a rotary motion about the eccentric shaft; an output member rotatable about the first axis and engaging with and following the intermediate member; and a cam mechanism interposed between the output member and the clutch and converting the rotary motion of the output member into a motion in a direction of the first axis.

DESCRIPTION OF EMBODIMENTS

Exemplary embodiments will be described hereinafter with reference to FIGS. 1 through 6B.

In FIGS. 1 through 4, upward and downward directions are respectively corresponding to fore and aft directions in a vehicle, but embodiments are not limited thereto. Further, while any terms defining directions, such as "input" and "output", are used for the convenience of explanation, the embodiments are not limited by these terms.

Figure 1:
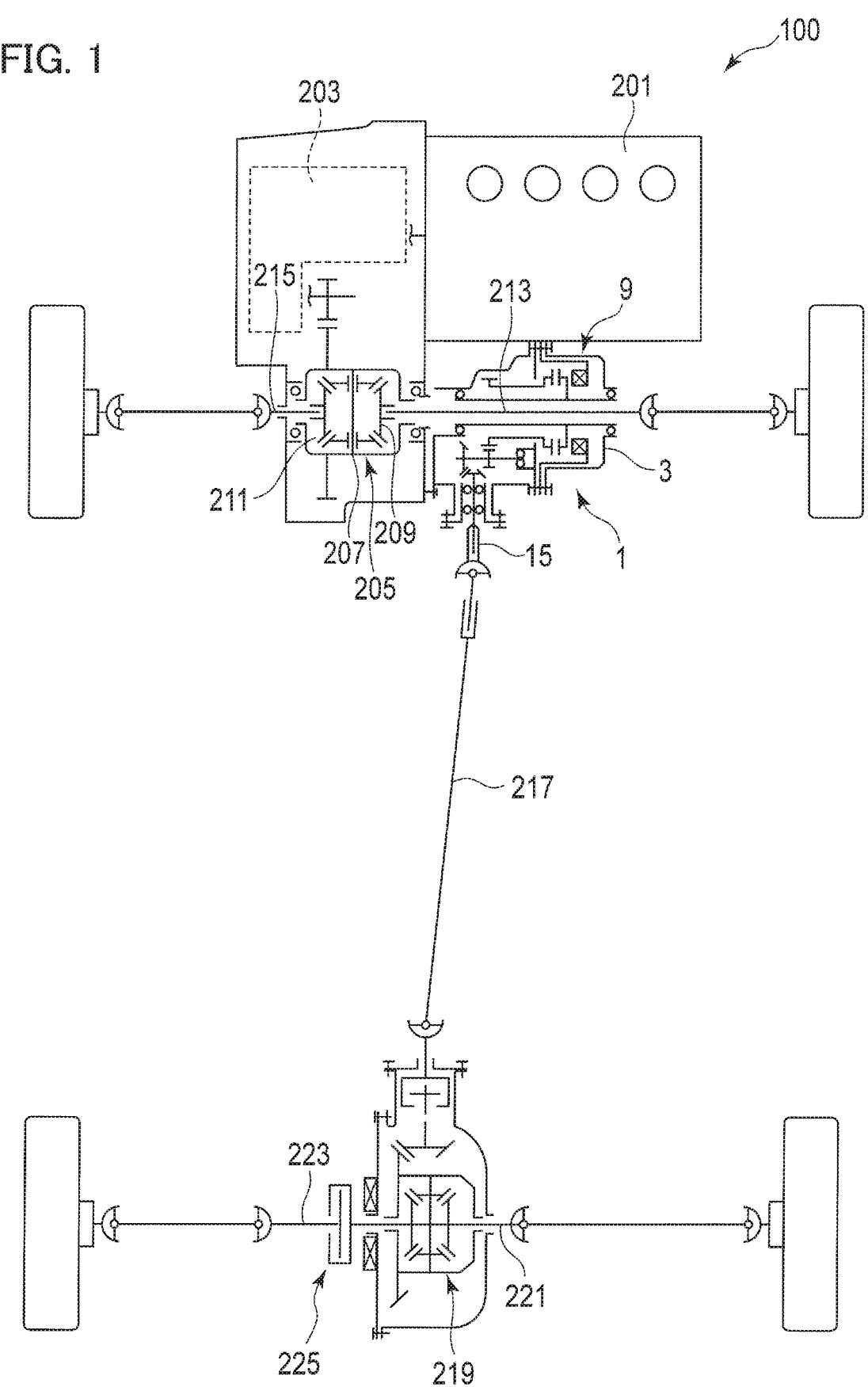
FIG. 1 is a drawing schematically depicting a powertrain system of a vehicle.

Referring to FIG. 1, a drivetrain system of a vehicle 100 is, on the vehicle 100 and at the front thereof, comprised of an engine and/or electric motor 201 and a transmission 203. The transmission 203 is comprised of a front differential 205, and a casing 207 thereof receives torque from the engine and/or electric motor 201 and thereby rotates.

As the front differential 205 is comprised of a differential gear set to transmit the torque input to the casing 207 to the right and left axles 213, 215 via both side gears 209, 211, allowing differential rotation therebetween. A bevel gear type can be exemplified as the differential gear set but any other type could be used.

In the illustrated example of the four-wheel drive vehicle, the vehicle body is further comprised of a rear differential 219 at the rear thereof, which is coupled with axles 221, 223, thereby allowing differential rotation between the rear wheels. In order to transmit the torque in part from the transmission 203 via a propeller shaft 217 to the rear differential 219, a power transfer unit (PTU) 1 can be used.

The PTU 1 extracts the torque transmitted into the differential case 207 in part to an output shaft 15. The output shaft 15 is, through a constant-velocity joint and the propeller shaft 217, coupled with the rear differential 219. To cut out torque transmission, the PTU 1 is comprised of a clutch 9. The rear differential 219 may be also comprised of a clutch to isolate the propeller shaft 217 from the system.

Figure 2:
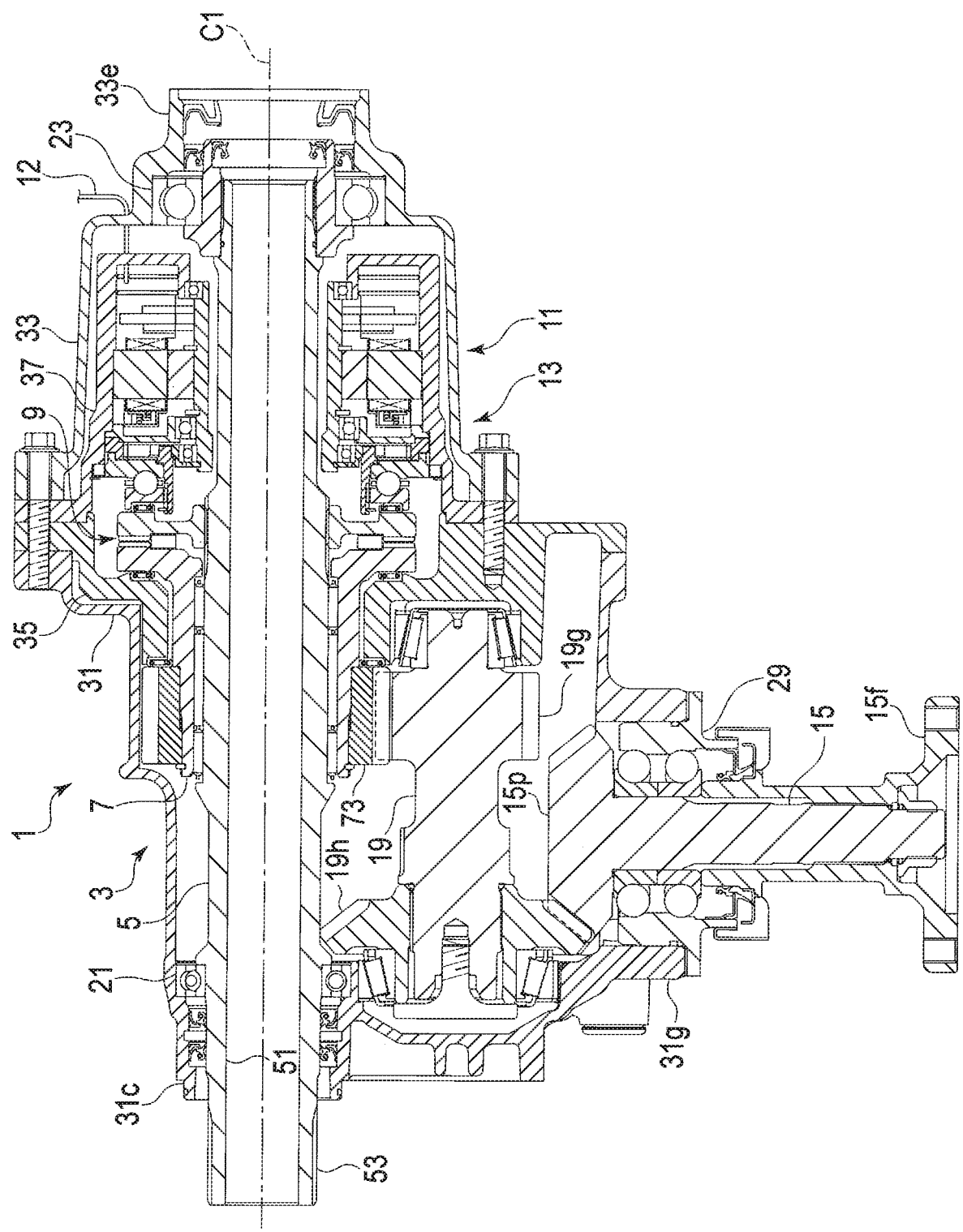
FIG. 2 is a sectional view of a power transfer unit according to an embodiment, which shows a plane passing both central axes of an input shaft and an output shaft.

Referring to FIG. 2, the PTU 1 is housed in the casing 3 and is comprised of an input shaft 5, an intermediate shaft 7 coaxial therewith and rotatable independently therefrom, the clutch 9 to disconnectably couple the input shaft 5 with the intermediate shaft 7, a motor 11, and a force-multiplication mechanism 13 for operating the clutch 9, and an output shaft 15 for outputting the torque. Coupled with and thereby receiving torque from the differential case 207 is the input shaft 5, and, when the clutch 9 is connected, the torque is transmitted to the intermediate shaft 7 and output to the output shaft 15 via the gear set. As the gear set is so constructed as to change the direction of rotation, the torque is output in an axial direction different from that of the input shaft 5.

The casing 3 is at least dividable into a first part 31 and a second part 33, and further comprised of sub-casings 35, 37 detachably fixed with these parts. The sub-casings 35, 37 are further dividable into a part 35 and the other part 37. While the casing 3 coaxially supports the input shaft 5, the intermediate shaft 7, the clutch 9, the motor 11 and the force-multiplication mechanism 13, particularly the intermediate shaft 7, the clutch 9, the motor 11 and the force-multiplication mechanism 13 are supported by the sub-casings 35, 37. Although details will be described later, these members supported by the sub-casings 35, 37 are sub-assemblies capable of being handled independently from the other members.

The first part 31 is, at its end 31c, combinable with the transmission 203, and an axle 213 is led out through the other end 33e. The input shaft 5 is rotatably supported by the casing 3 and receives torque from the front differential 205. To enable smooth rotation, ball bearings 21, 23 for example are interposed between the input shaft 5 and the casing 3. The first part 31 is comprised of a section 31g for supporting the output shaft 15 in an axial direction different from a direction of the axis C1 of the input shaft 5. Any bearing unit 29 for example is applicable for the purpose of rotatable support.

The input shaft 5 is, as described above, supported so as to be rotatable about the axis C1, and a hollow 51 runs therethrough along the axis C1. This hollow 51 is so dimensioned as to allow penetration by the axle 213. One end thereof projects out of the end 31c of the casing 3 and is comprised of splines 53 for example in order to couple with the casing 207 of the front differential 205. The other end thereof is exposed to the opposite end 33e of the casing 3. The input shaft 5 may be entirely of a unitary body or may be appropriately dividable.

Figure 3:
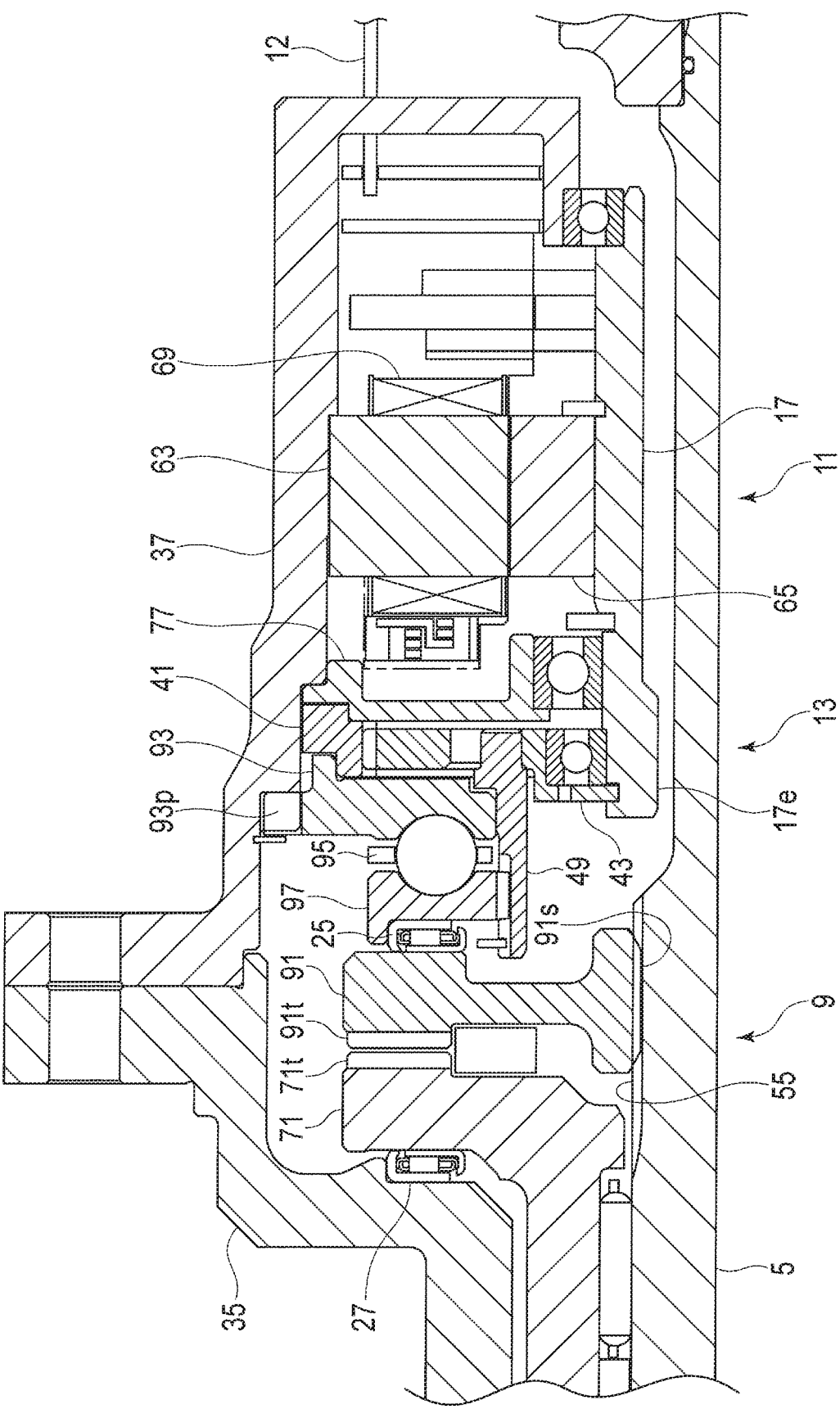
FIG. 3 is a partial sectional view showing an enlarged view of a clutch, a cam mechanism and a motor in the power transfer unit.

The intermediate shaft 7 is, as described above, coaxial with the input shaft 5 and rotatably fits on the external periphery of the input shaft 5. Any needle bearing or such may be interposed between the intermediate shaft 7 and the input shaft 5 so as to enable smooth rotation and maintain the coaxial relation. Referring to FIG. 3 in combination with FIG. 2, the intermediate shaft 7 is comprised of a clutch section 71 and a gear section 73 as a unitary body or separate bodies. The clutch section 71 is a part of the clutch 9 as described later and the gear section 73 is a part of the gear set for output to the output shaft 15.

In a case where the PTU 1 is of the one-stage type, the gear section 73 may be a bevel gear for example, which is directly in mesh with the output shaft 15, but, in a case of the illustrated two-stage type, the gear section 73 has a mediation shaft 19 intervening therebetween. In the latter case, the gear section 73 is a cylindrical gear and the mediation shaft 19 is comprised of a gear section 19g corresponding thereto. The mediation shaft 19 is further comprised of a bevel gear 19h in mesh with the output shaft 15. The output shaft 15 is comprised of a pinion gear section 15p corresponding to any of these bevel gears and, through mutual gearing, transmits the torque extracted by the intermediate shaft 7 to the exterior. The output shaft 15 is, around its external end, comprised of a proper structure for coupling with the propeller shaft such as a companion flange 15f for example. The PTU 1 may be of either the one-stage type, the two-stage type, or any other type.

The clutch section 71 of the intermediate shaft 7 is elongated into the interior of the sub-casings 35, 37 and may spread radially outwardly in a flange-like manner. The back of the clutch section 71 faces the inner surface of the sub-casing 35. Between this back and the sub-casing 35 preferably interposed is a thrust bearing 27 in order to enable smooth rotation and bear the thrust force. A face opposed to this back is toothed to form clutch teeth 71t and a combination thereof and clutch teeth 91t constitutes the clutch 9 of the dog clutch type.

The clutch 9 is further comprised of a movable member 91. The movable member 91 is, in the internal end, comprised of keys 91s extending along the axis C1, the input shaft 5 is correspondingly comprised of splines 55. These keys and splines are mutually in mesh to directly couple the output shaft 5 with the movable member 91, thereby transmitting the torque. As the keys 91s and the splines 55 extend in the direction of the axis C1, the movable body 91 is movable in the direction of the axis C1 when receiving the thrust force from the force-multiplication mechanism 13.

The movable member 91 spreads radially outwardly in a flange-like manner corresponding to the clutch member 71, and one face thereof is comprised of clutch teeth 91t corresponding to the clutch teeth 71t. Its back face faces the force-multiplication mechanism 13 to receive its thrust force and preferably has a thrust bearing 25 interposed between the back face and the force-multiplication mechanism 13. The movable member 91, when receiving the thrust force from the force-multiplication mechanism 13, moves toward the clutch section 71 and then the clutch 9 gets connected, thereby transmitting the torque from the input shaft 5 to the intermediate shaft 7. To promote disconnection in the absence of the thrust force, any repulsive means such as a spring may be used and further may be interposed between the clutch section 71 and the movable member 91.

Figure 4:
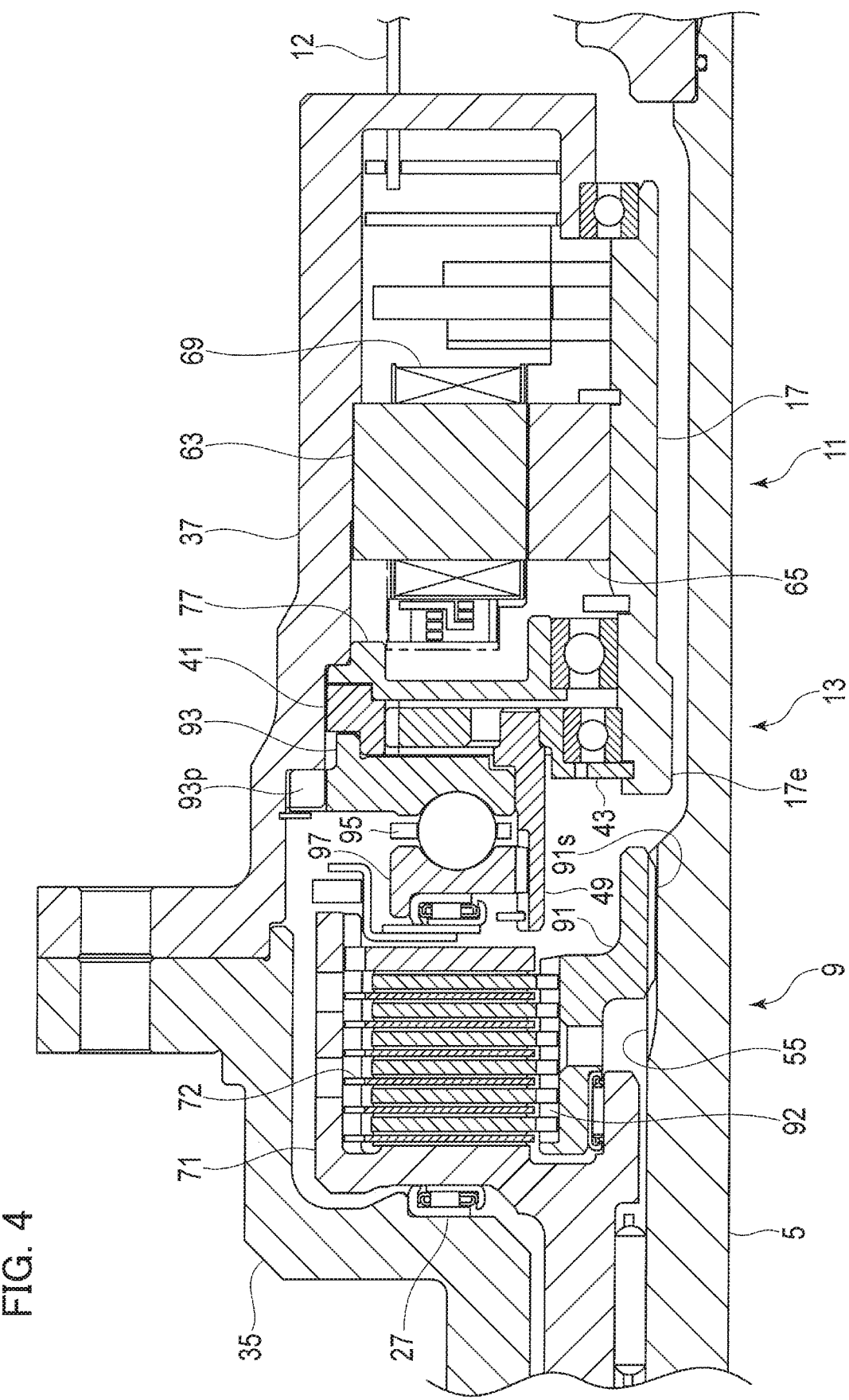
FIG. 4 is a partial sectional view of a power transfer unit with a clutch according to another embodiment, which is corresponding to FIG. 3.

The above explanation has been based on the example where the clutch 9 is of the dog clutch type but the clutch 9 may be of the multi-plate clutch type as illustrated in FIG. 4. The clutch section 71 is, instead of having clutch teeth, formed of a drum-like shape with an internal periphery having keys 72 in mesh with a plurality of clutch plates. The movable member 91 gets into the interior of the drum and its outer face is comprised of keys 92 in mesh with a plurality of clutch plates. The clutch plates respectively in mesh with the keys 91, 92 are arranged alternately to form a multi-plate clutch and face the force-multiplication mechanism 13. When the multi-plate clutch receives the thrust force from the force-multiplication mechanism 13, the clutch 9 is connected, thereby transmitting the torque from the input shaft 5 to the intermediated shaft 7. To promote disconnection in the absence of the thrust force, any repulsive means such as a spring to urge the force-multiplication mechanism 13 in the opposite direction may be used and further may be interposed between the clutch 9 and the force-multiplication mechanism 13.

Alternatively, in place of the dog clutch or the multi-plate clutch, any other type such as a cone clutch is applicable thereto.

Mainly referring to FIG. 3 or FIG. 4, the motor 11 is comprised of a stator 63, a rotor 65 to rotate relative to the stator 63, and a coil 69 to electromagnetically drive the rotor 65. Wiring 12 is led out of the coil 69 and connected to a power source. This wiring 12 is also connected to an ECU (electronic control unit) on the vehicle and controlled thereby so that rotation of the rotor 65 is controlled.

The whole of the motor 11 is supported by the sub-casing 37 and particularly its stator 63 is fixed thereto. In contrast, the rotor 65 is rotatable relative to the stator 63 and the sub-casing 37. Both are preferably structured so as to be coaxial about the axis C1 but it is possible that only the rotor 65 is made coaxial with and rotatable about the axis C1 at the minimum.

The force-multiplication mechanism 13 is a mechanism for multiplying and converting output by the motor 11 into the thrust force for pressing the clutch 9, and is also supported by the sub-casing 37. The force-multiplication mechanism 13 is in general comprised of a reduction gear section for reducing speed (multiplying force) of the rotation by the rotor 65, and a cam mechanism for converting the rotational motion into an axial motion.

The reduction gear section is in general comprised of an input member 17 rotatable about the axis C1, a fixed member 41 immovable about the axis C1, an intermediate member 43 rotatably fitting on the fixed member 41, and an output member 49 engaging with the intermediate member 43.

Figure 5:
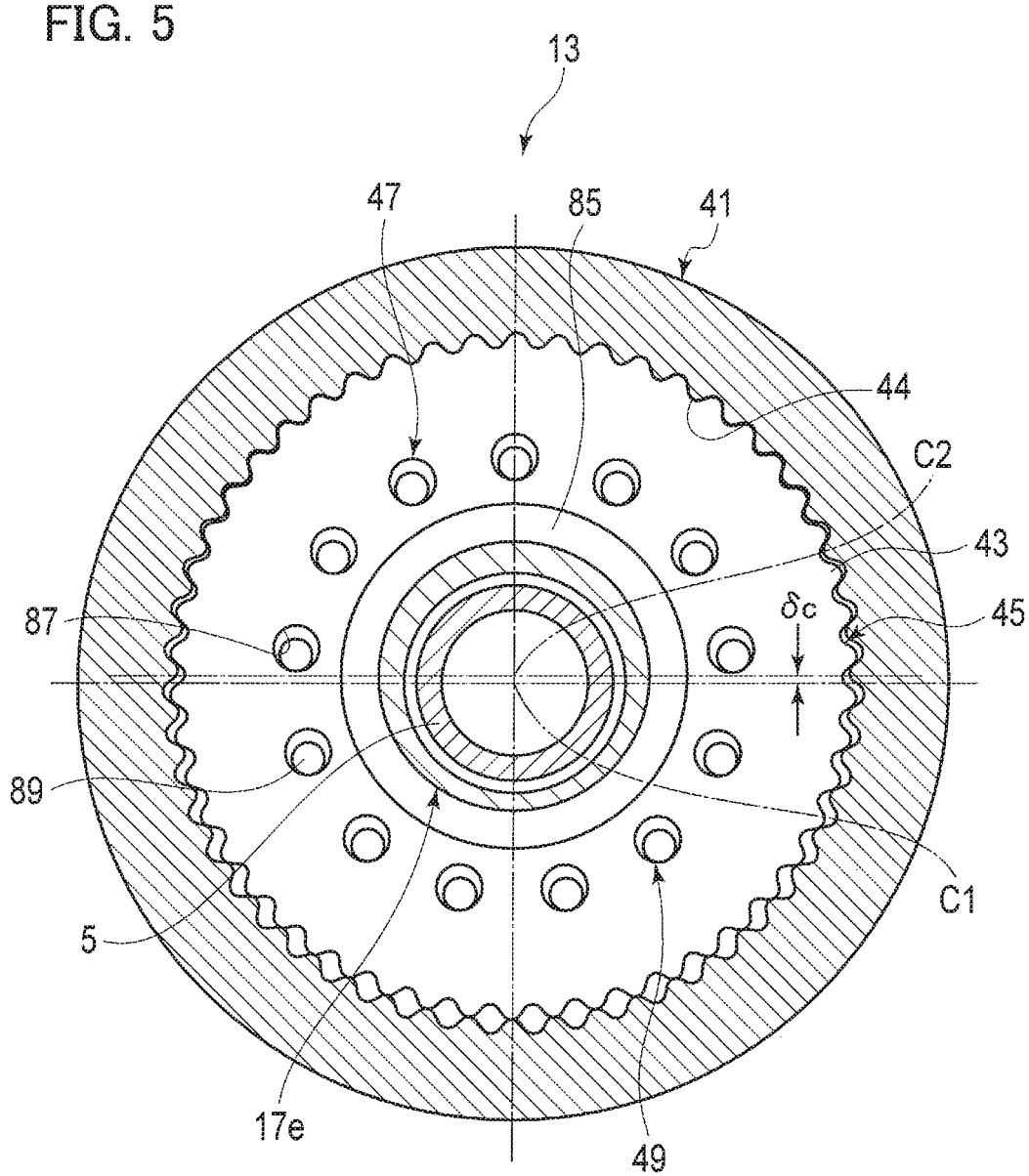
FIG. 5 is a sectional side view taken from the cam mechanism cut along a plane perpendicular to an axis of the cam mechanism.

The input member 17 has a structure similar to a cylinder and is coupled with the rotor 65 and rotatable about the axis C1. While the input member 17 around the part coupled with the rotor 65 is a cylinder symmetrical about the axis C1, it includes an eccentric section 17e elongated axially therefrom, which is eccentric from the axis C1. Referring to FIG. 5, a central axis C2 of the eccentric section 17e deviates from the axis C1 by a deviation 5c. When the input member 17 rotates about the axis C1, the eccentric section 17e and the axis C2 make an eccentric rotation about the axis C1.

Referring to FIG. 3 or FIG. 4 in combination with FIG. 5, the fixed member 41 has a disk-like structure symmetrical about the axis C1 and is secured or fixed to the sub-casing 37 so as to be immovable about the axis C1. The fixed member 41, on its outer periphery, has a structure for meshing with the intermediate member 43, and an example thereof is an internal gear 44.

The intermediate member 43 has a disc-like structure as well, and at its center fits on the eccentric member 17e to make an eccentric rotation therewith. The intermediate member 43, on its inner periphery, has a structure for meshing with the fixed member 41, and an example thereof is an external gear 45. As the intermediate member 43 is in mesh with the fixed member 41 and simultaneously makes the eccentric rotation along with the eccentric section 17e, it can also make a rotary motion about the axis C2. As the rotary motion could not be created if the tooth number of the internal gear 44 and the tooth number of the external gear 45, they should have different numbers. Preferably the tooth number of the internal gear 44 may be made larger by one or more than the tooth number of the external gear 45.

The tooth profile applicable to the internal gear 44 and the external gear 45 is the involute, the cycloid, the arc, or the epitrochoidal parallel curve.

The output member 49 has a structure similar to a cylinder and at its end engages with the intermediate member 43. Referring to FIG. 6, for mutual engagement, the intermediate member 43 and the output member 49 have engagement sections 47. The engagement sections 47 are for example comprised of a plurality of engagement holes 87 opened and arranged along a circle around the axis C2 and a plurality of engagement pins 89 corresponding thereto, which project from the output member 49. Each engagement hole 87 may be either a bottomed hole or a through-hole. Each engagement hole 87 is larger in diameter than each engagement pin 89 in order to absorb difference between the rotational centers. To reduce friction between each engagement hole 87 and each engagement pin 89, a sliding bush or a bearing may be interposed therebetween. By these mutual engagements, the output member follows the intermediate member 43 to make a rotational motion about the axis C1.

Referring again to FIG. 3 or FIG. 4, the output member 49 is, at an end opposite to the engagement pins 89 and on its outer periphery, comprised of a structure for engagement such as splines to engage with a cam rotor 97 as described later.

The cam mechanism is constituted of a combination of a cam stator 93 and a cam rotor 97, and is interposed between the output member 49 and the clutch 9. The cam mechanism converts the rotary motion into the axial motion. For conversion, one or both of the cam stator 93 and the cam rotor 97 may be comprised of cam projections, or alternatively any intervening member such as cam balls 95 may be interposed therebetween. While an example with the cam balls 95 will be described below, needless to say, the following description does not limit the embodiment.

Figure 6A:
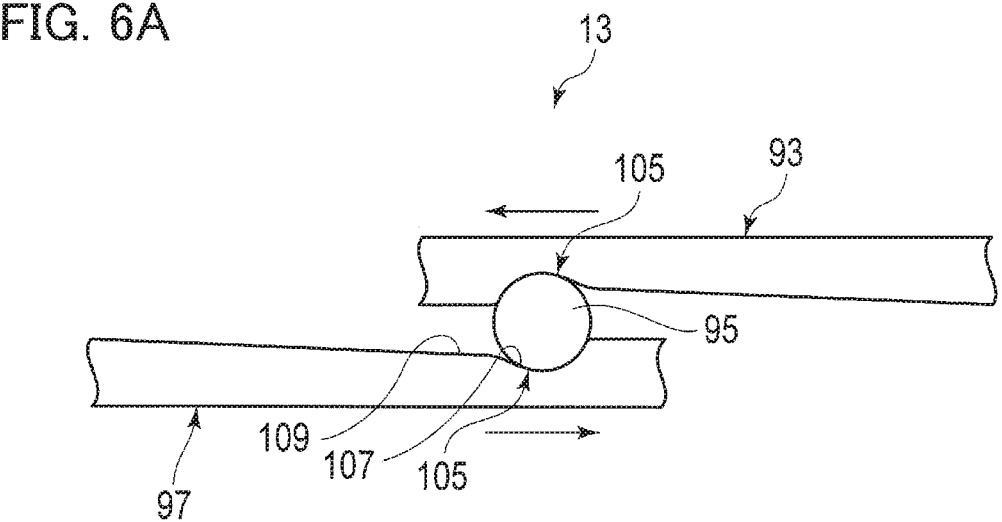
FIG. 6A is a schematic drawing showing a developed view of the cam mechanism developed in a plane along a circumferential direction.

Referring to FIG. 6A, the cam stator 93 and the cam rotor 97 are ring-like members opposed to each other. One or both of them have a plurality of cam faces 105, each of which is oblique to and therefore gets gradually shallower toward the circumferential direction.

Figure 6B:
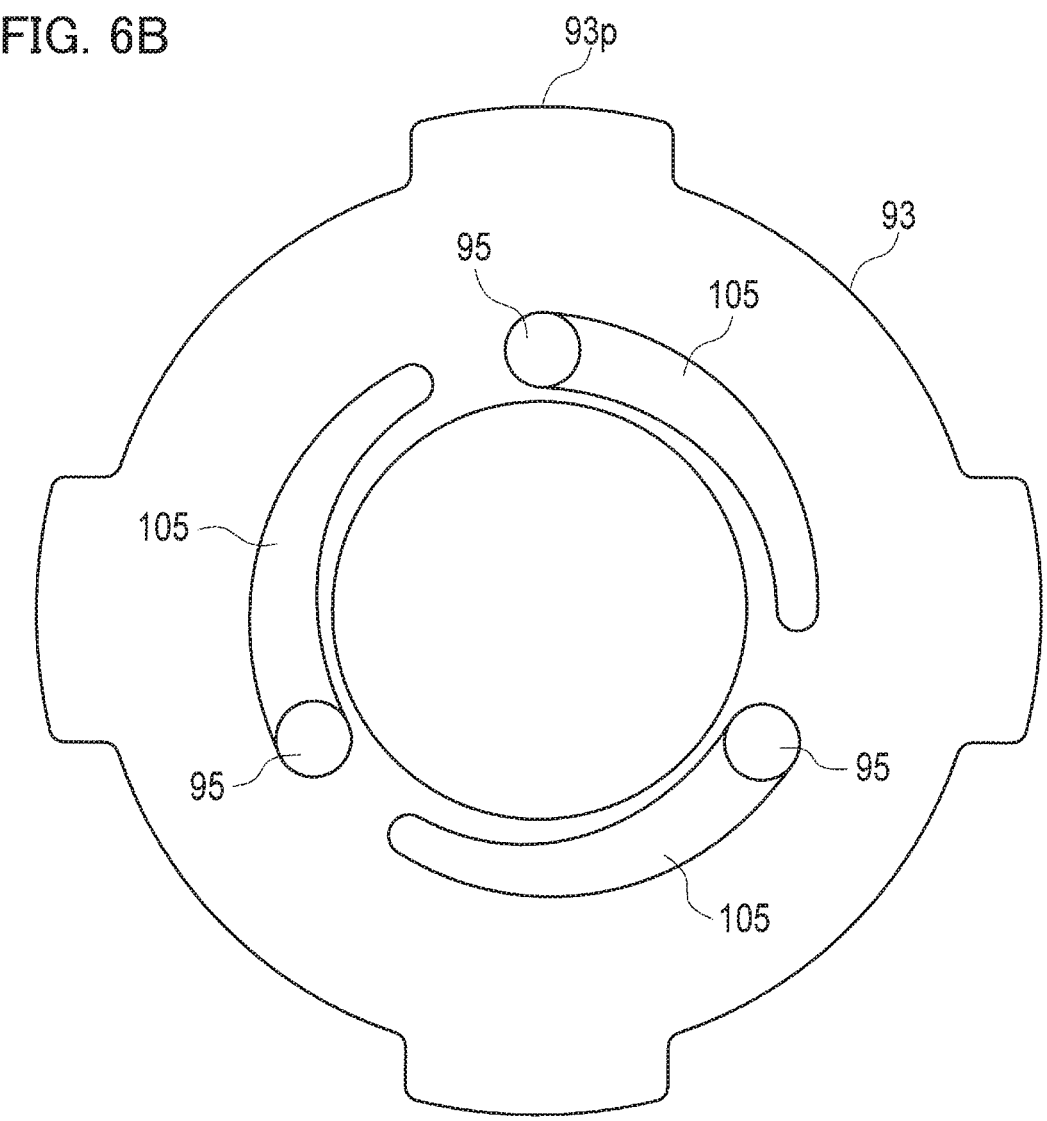
FIG. 6B is a side view of the cam mechanism viewed in the axial direction.

Referring to FIG. 6B, the cam stator 93 is comprised of one or more tabs 93p projecting radially outward. The tabs 93p, as being understood from FIGS. 3 and 4, make the cam stator 93 anti-rotated to the sub-casing 37. The cam rotor 97, on the other hand, can rotate along with the output member 49.

Referring again to FIG. 6A, as the cam stator 93 stands still while the cam rotor 97 rotates, the cam rotor 97 is pushed out along the oblique cam faces 105 by means of the cam balls 95, thereby converting the rotary motion into the axial motion. Preferably, to make the force acting on the cam mechanism be symmetrical about the axis, the cam faces 105 could be formed to have mutually rotational symmetry about the axis C1.

Each cam face 105 may be comprised of a steeper first slope 107 and a gentler second slope 109 continuously transitioning toto first slope 107. This structure creates a particular profile in a curve of the travel distance ratio of axial to rotary motion (stroke ratio) in a manner described below.

At the initial state, each cam ball 95 rests on the bottom of the first slope 107. When the output member 49 transmits its rotation to the cam rotor 97, the cam ball 95 initially ascends the steeper first slope 107 so that the cam rotor 97 axially moves with a relatively large stroke ratio. Although this configuration creates a relatively small pressure force, it urges the cam rotor 97 quickly toward the clutch 9. Until the cam rotor 97 butts against the clutch 9, a great pressure force is unnecessary. Thus this configuration is preferable in this step. Next the cam ball 95 keeps ascending the gentler second slope 109 and then the cam rotor 97 axially moves with a relatively small stroke ratio. This configuration creates a relatively large pressure force and is therefore preferable in the step where a great pressure force is required after the cam rotor 97 butts against the clutch 9.

The thrust force and its reaction force, both acting on the clutch 9, must balance with each other. Referring again to FIG. 3 or FIG. 4, the thrust force acting on the clutch 9 is received by the thrust bearing 27 and next borne by the sub-casing 35. The reaction force is, via the force-multiplication mechanism 13, received by the sub-casing 37. As the sub-casing 35 and the sub-casing 37 are mutually directly fixed, the thrust force and its reaction force balance with each other within the ambit of the sub-casings 35, 37 and therefore do not act on the exterior thereof. Further, on paths that transmit the thrust force and its reaction force, there's no member vulnerable to thrust force, such as a ball bearing. In addition, thrust bearings bear rotating bodies. Therefore it does not raise any problem even if a large thrust force acts on the clutch 9.

Further, the intermediate shaft 7, the clutch 9, the motor 11, the force-multiplication mechanism 13, and the sub-casings 35, 37 form a sub-assembly that enables a person to handle them like as a unitary body. They can be assembled separately from the other members and, at the final step in the assembly process, combined with these other members.

According to the present embodiment, the intermediate member 43 engaging with the fixed member 41 makes the eccentric motion along with the eccentric section 17e and the resultant rotary motion thereby is used for reducing the rotation of the motor 11. Therefore this embodiment enables an extremely large reduction ratio. In a case where the engagement between the intermediate member 43 and the fixed member 41 is established by the internal gear 44 and the external gear 45 having different tooth numbers, the reduction ratio is determined by these tooth numbers and the difference therebetween. In a case where the tooth number of the internal gear 44 is 50 and the tooth number of the external gear 45 is 49, for example, the output member 49 makes only 1/50 revolution while the motor 11 makes one revolution. As the reduction ratio is far larger than that of the prior art, the output force of the motor 1 is multiplied to a far greater degree and further converted into the axial pressure force by the cam mechanism. Specifically, the power transmission device 1 according to the present embodiments can connect the clutch 9 with a great pressure force even if a motor 11 with small power is used. Further, as the gently slanted cam faces are used to create the pressure force, it enables gradual increase or decrease in the pressure force. Specifically, this realizes high controllability in the pressure force, therefore the device can be used as well to control torque distribution to the front and rear wheels.

More specifically, according to the present embodiments, as the force-multiplication mechanism 13 can create sufficiently large thrust force, any additional structure is unnecessary to maintain connection of the clutch and therefore the device provides high reliability. Further, it is suitable for using a clutch of a type that requires relatively great thrust force, such as a multi-plate clutch. Needless to say, the multi-plate clutch enables increase and decrease in connection force of the clutch, thereby enabling control of torque distribution to the front and rear wheels.

Further the present embodiments do not require a complex gear system for creating a large reduction ratio and therefore enables reduction in size, particularly in its radial directions. Vehicles are not required to provide big spaces therein in order to have PTUs on board. Further the embodiments require only small weight increase and are therefore superior in fuel economy.

Although certain exemplary embodiments have been described above, modifications and variations of the embodiments described above will occur to those skilled in the art, in light of the above teachings.

INDUSTRIAL APPLICABILITY

The disclosure provides a disconnectable power transfer unit with high reliability, while it is compact.

The invention claimed is:

1. A power transfer unit intermissively transferring torque about a first axis toward a second axis different from the first axis, comprising:
a hollow input shaft rotatable about the first axis and so dimensioned as to allow penetration of an axle along the first axis;
an intermediate shaft rotatable independently from the input shaft about the first axis;
an output shaft in mesh with the intermediate shaft and rotatable about the second axis;
a clutch disconnectably and drivingly coupling the input shaft with the intermediate shaft;
a motor including a rotor rotating about the first shaft;
an input member coupled with the rotor to be rotatable about the first axis and including an eccentric shaft eccentric from the first axis;
a fixed member immovable about the first axis;
an intermediate member fitting on the eccentric shaft to make an eccentric motion and meshing with the fixed member to make a rotary motion about the eccentric shaft;
an output member rotatable about the first axis and engaging with and following the intermediate member; and
a cam mechanism interposed between the output member and the clutch and converting the rotary motion of the output member into a motion in a direction of the first axis.

2. The power transfer unit of claim 1, wherein the clutch comprises a first clutch member movable in the direction of the first axis and coupled with the input shaft, and a second clutch member coupled with the intermediate shaft, the first clutch member being so exposed to the cam mechanism as to be pressed by the cam mechanism to connect with the second clutch member.

3. The power transfer unit of claim 2, wherein the first clutch member comprises a key extending in the direction of the first axis and directly coupling the first clutch member with the input shaft.

4. The power transfer unit of claim 1, further comprising:
a casing;
a sub-casing detachably fixed to the casing and supporting at least the clutch and the cam mechanism; and
a thrust bearing interposed between the clutch and the sub-casing to receive a thrust force by the cam mechanism.

5. The power transfer unit of claim 1, wherein the fixed member comprises an internal gear having a first tooth number, and the intermediate member comprises an external gear in mesh with the internal gear and having a second tooth number smaller than the first tooth number, whereby the intermediate member is in mesh with the fixed member.

6. The power transfer unit of claim 1, wherein the cam mechanism comprises:
a cam stator coupled with or forming a unitary body with the fixed member; and
a cam rotor axially movable and engaging and rotating with the output member, the cam rotor being pressed by the cam stator to make a motion in the direction of the first axis and press the clutch.

7. The power transfer unit of claim 6, where any one or both of the cam rotor and the cam stator comprise a cam projection, or a cam member is interposed between the cam rotor and the cam stator, so that the cam mechanism converts the rotary motion of the output member into the motion in the direction of the first axis.

\* \* \* \* \*